(12) United States Patent
Fujisawa

(10) Patent No.: US 12,469,006 B2
(45) Date of Patent: Nov. 11, 2025

(54) TRANSPORT SYSTEM AND PROGRAM

(71) Applicant: Kazunori Fujisawa, Tokyo (JP)

(72) Inventor: Kazunori Fujisawa, Tokyo (JP)

( * ) Notice: Subject to any disclaimer, the term of this patent is extended or adjusted under 35 U.S.C. 154(b) by 0 days.

(21) Appl. No.: 18/042,079

(22) PCT Filed: Aug. 11, 2021

(86) PCT No.: PCT/JP2021/029583
§ 371 (c)(1),
(2) Date: Feb. 17, 2023

(87) PCT Pub. No.: WO2022/039074
PCT Pub. Date: Feb. 24, 2022

(65) Prior Publication Data
US 2023/0267413 A1  Aug. 24, 2023

(30) Foreign Application Priority Data
Aug. 20, 2020  (JP) ................ 2020-139271

(51) Int. Cl.
*G06Q 10/0875* (2023.01)
*G05D 1/00* (2006.01)
*G06Q 30/0601* (2023.01)

(52) U.S. Cl.
CPC ....... *G06Q 10/0875* (2013.01); *G05D 1/0212* (2013.01); *G06Q 30/0601* (2013.01)

(58) Field of Classification Search
CPC .... G06Q 10/087; G06Q 10/0875; G05D 1/02; G05D 1/0212
(Continued)

(56) References Cited

U.S. PATENT DOCUMENTS 9,805,519 B2 * 10/2017 Ramanujam ..... G06Q 10/06311
10,222,798 B1 * 3/2019 Brady ................ G06Q 10/0832
(Continued)

FOREIGN PATENT DOCUMENTS

CN 104299158 A 1/2015
CN 104820943 A 8/2015
(Continued)

OTHER PUBLICATIONS

Japan Document 2020007148 dated Jan. 2020, Inventor: Keiko.*
(Continued)

*Primary Examiner* — Andrew Joseph Rudy
(74) *Attorney, Agent, or Firm* — Muncy, Geissler, Olds & Lowe, P.C.

(57) ABSTRACT

Provided is a transport system that can meet diverse user needs. The transport system is provided with one or more management servers, an AGV having an accommodation part with which to accommodate, at a nearest location, a product purchased in an e-commerce transaction, and a user terminal that instructs the management server or the AGV to transport the product, wherein the user terminal is provided with an instruction interface for issuing an instruction to pick up the product using the AGV as a pickup method in a case in which the product is purchased in an e-commerce transaction with the management server, and the AGV is controlled, based on control by the management server according to the instruction issued through the instruction interface, to execute pickup of the product.

7 Claims, 10 Drawing Sheets

(58) Field of Classification Search
USPC .......................................................... 701/29
See application file for complete search history.

(56) References Cited

U.S. PATENT DOCUMENTS

| | | | |
|---|---|---|---|
| 10,241,516 B1* | 3/2019 | Brady | G05D 1/0027 |
| 10,611,569 B2* | 4/2020 | Kurimoto | G06Q 10/087 |
| 10,679,176 B2* | 6/2020 | Goulart | G06Q 10/087 |
| 11,031,795 B2* | 6/2021 | Velderman | H02J 7/00 |
| 11,196,563 B2* | 12/2021 | Matsumoto | H04L 9/321 |
| 11,510,541 B2* | 11/2022 | Moroniti | A47L 9/2826 |
| 11,592,823 B2* | 2/2023 | Han | G05D 1/644 |
| 2017/0090484 A1 | 3/2017 | Obaidi | |
| 2020/0090121 A1* | 3/2020 | Gupta | G06Q 50/28 |
| 2021/0349465 A1* | 11/2021 | Gillett | B62K 21/22 |
| 2022/0270039 A1* | 8/2022 | Nagarathinam | H04W 4/35 |

FOREIGN PATENT DOCUMENTS

| | | |
|---|---|---|
| CN | 110834724 A | 2/2020 |
| CN | 111098313 A | 5/2020 |
| JP | 2016-151989 A | 8/2016 |
| JP | 2019-069855 A | 5/2019 |
| JP | 2019-074926 A | 5/2019 |
| JP | 2019-117595 A | 7/2019 |
| JP | 2020-007148 A | 1/2020 |
| WO | 2017/115447 A1 | 7/2017 |

OTHER PUBLICATIONS

Japan Document 2019074926 dated May 2019, Inventor: Toshihiro et al.*
The extended European search report of the corresponding EP application No. 21858221.1 mailed Jan. 2, 2024.
Office Action of the corresponding CN application No. 202180051051.5 issued Sep. 24, 2023 and English translation thereof.
The second office action of the corresponding CN application No. 202180051051.5 mailed Apr. 27, 2024 and English translation thereof.
Decision of Rejection of the corresponding CN application No. 202180051051.5 mailed Jul. 21, 2024 and English translation thereof.

* cited by examiner

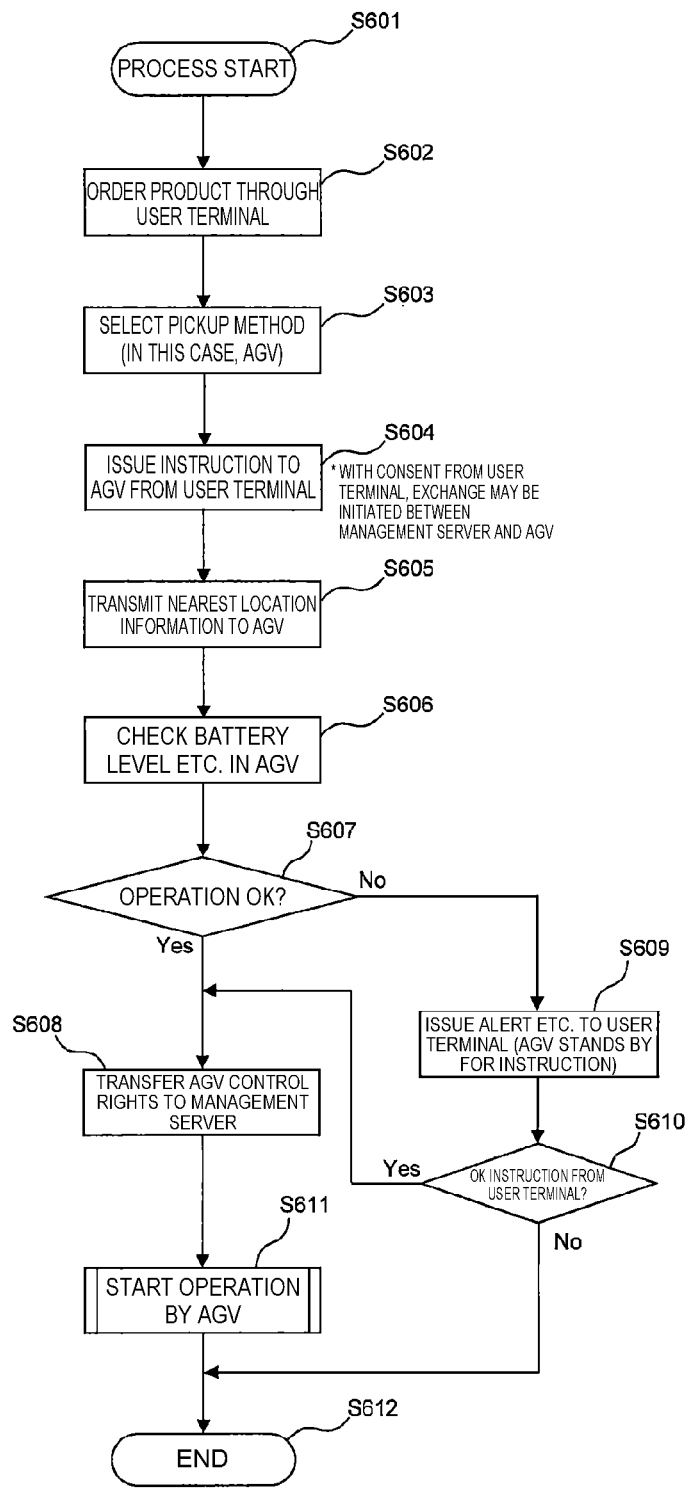

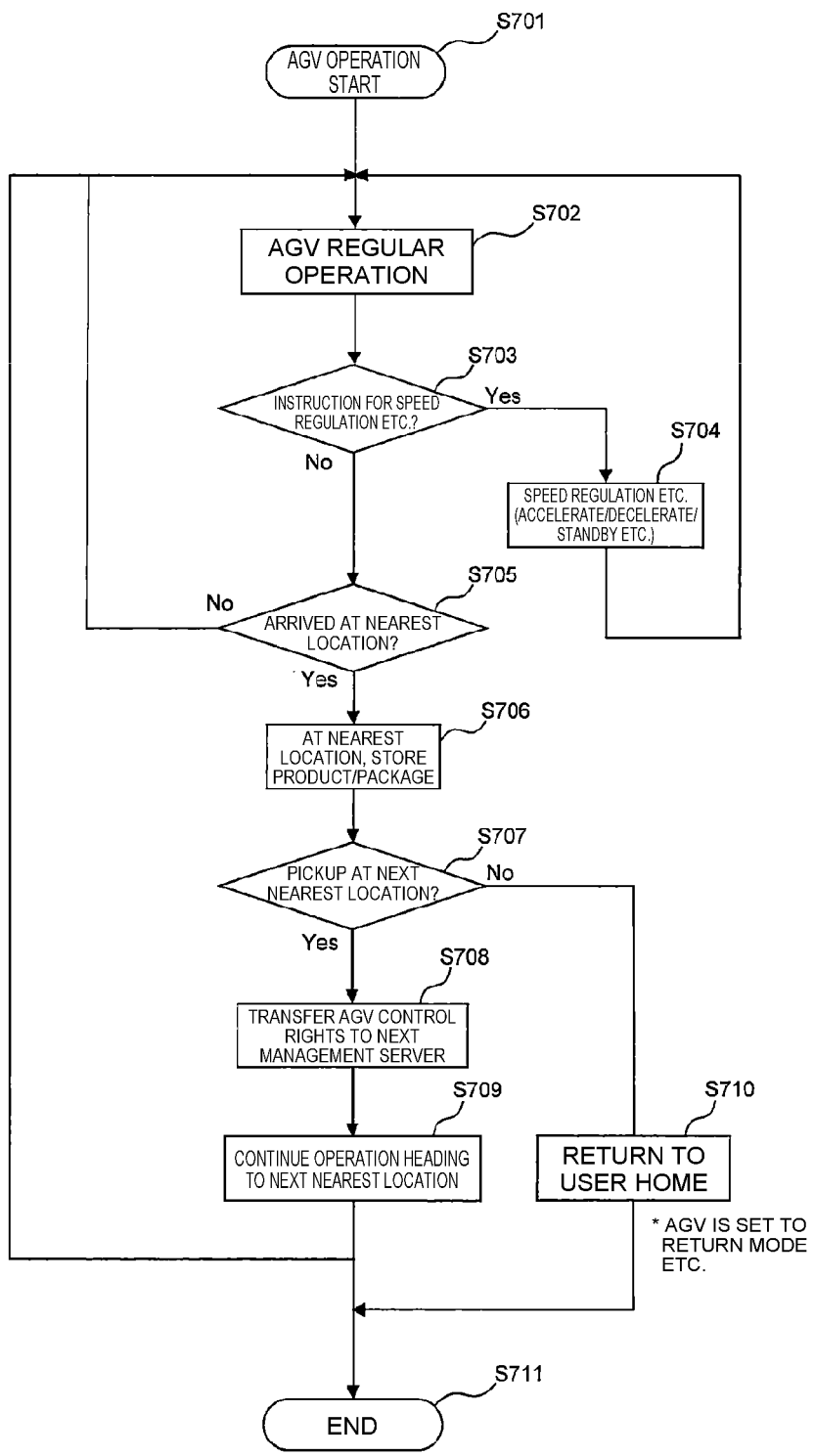

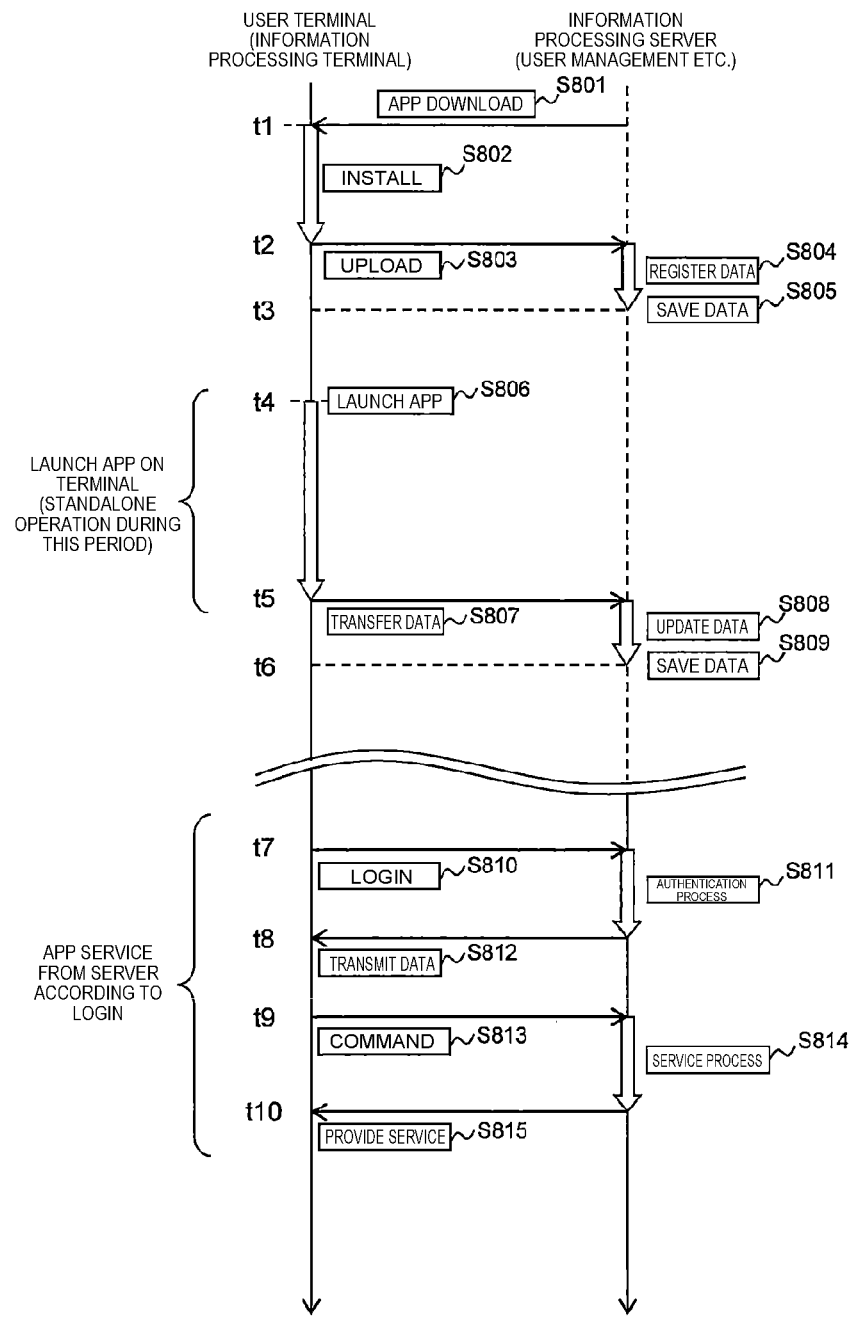

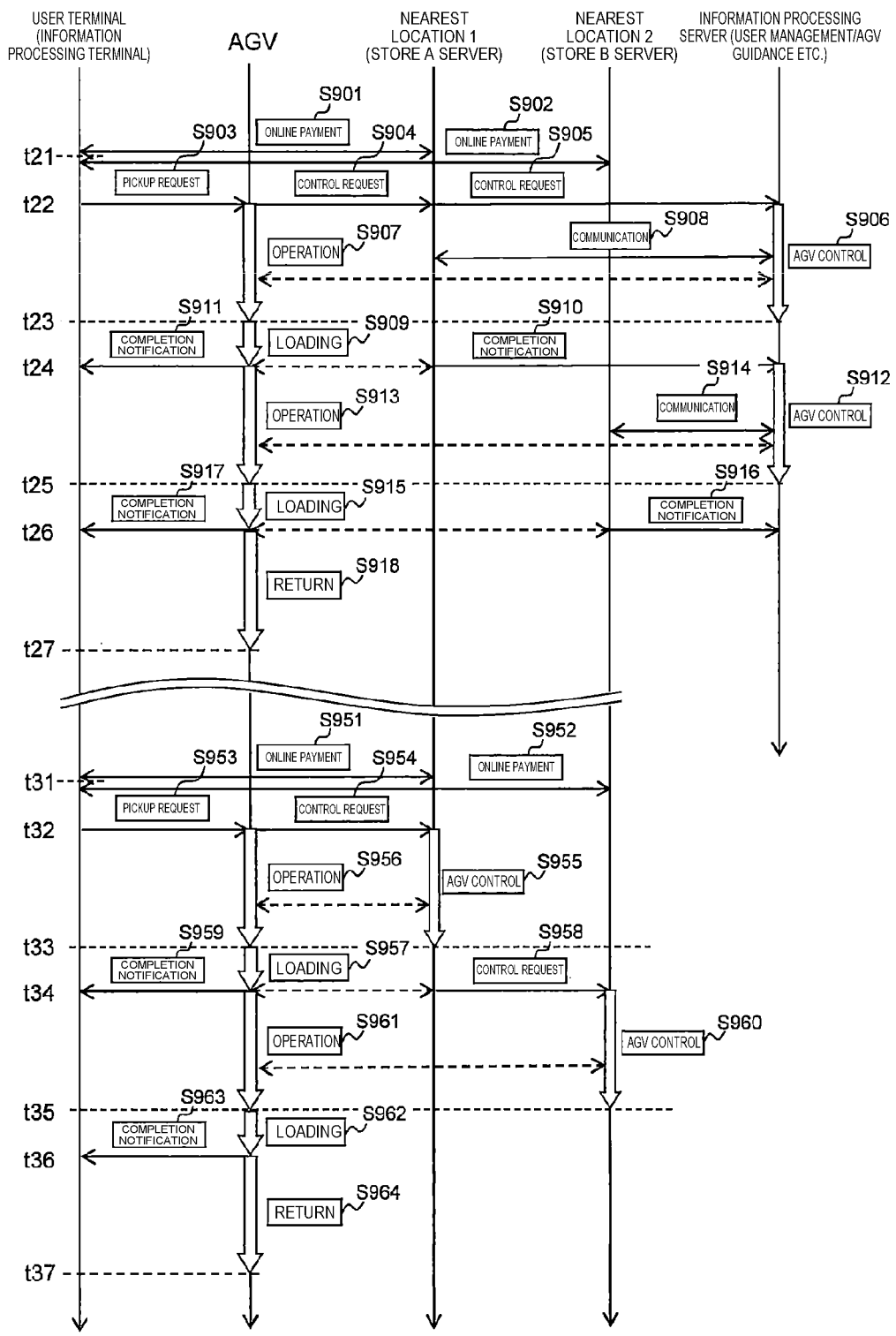

TRANSPORT SYSTEM AND PROGRAM

TECHNICAL FIELD

The present invention relates broadly to a transport system and the like that transports packages and products, and more particularly, to a transport system and the like using unmanned vehicles such as automated guided vehicles and drones.

BACKGROUND ART

In recent years, transport systems, including delivery systems that deliver packages and products to delivery addresses, have adopted unmanned vehicles (UVs) such as automated guided vehicles (AGVs) and drones to improve the efficiency of delivery and pickup operations for packages and the like, and various innovations have been proposed.

For example, a transport system capable of transporting a transaction medium by an unmanned aerial vehicle and preventing unauthorized transactions with the transaction medium due to loss or theft has been proposed (Patent Literature 1).

Specifically, Patent Literature 1 discloses a transport system provided with: an unmanned aerial vehicle having an accommodation part that accommodates a transaction medium to be used in a financial transaction; and an information processing device including a control unit that causes the transaction medium to be unusable while the unmanned aerial vehicle accommodating the transaction medium is in mid-flight and causes the transaction medium to be usable if the unmanned aerial vehicle arrives at a destination.

Also, a delivery system that ensures that packages can be delivered reliably and picked up reliably, regardless of the circumstances of the recipient, has been proposed (Patent Literature 2).

That is, Patent Literature 2 discloses a delivery system including: a delivery vehicle carrying a delivery box to be delivered to a delivery address; and a mother vehicle bearing the delivery vehicle, characterized in that the delivery vehicle is controlled to deboard the mother vehicle and move to the delivery address, the delivery vehicle can secure the delivery box to a delivery box fixture provided at the delivery address, and if the delivery box fixture is not provided at the delivery address, a recipient of a package accommodated in the delivery box is notified of the arrival of the package, and the delivery vehicle stands by at a prescribed standby location to hand over the package to the recipient.

Also, a package delivery support system for improving the efficiency of package delivery and pickup operations has been proposed (Patent Literature 3).

That is, Patent Literature 3 discloses a package delivery support system provided with at least one moving body deployed in a region and a management device for the moving body, wherein the management device includes: acquiring means for acquiring at least one of a delivery request pertaining to a package loaded onto the moving body and a pickup request pertaining to pickup of a package using the moving body; and supplying means for supplying to the moving body an instruction causing the moving body to move to a location designated in at least one of the delivery request and the pickup request.

CITATION LIST

Patent Literature

Patent Literature 1: Japanese Patent Laid-Open No. 2016-151989

Patent Literature 2: Japanese Patent Laid-Open No. 2019-069855

Patent Literature 3: Japanese Patent Laid-Open No. 2019-117595

SUMMARY OF INVENTION

Technical Problem

However, even if above technologies of the related art are accounted for, further improvements are expected in transport systems and the like that can meet even more diverse user needs.

Solution to Problem

Accordingly, a transport system and the like according to an embodiment of the present invention is a transport system provided with one or more management servers, an AGV having an accommodation part with which to accommodate, at a nearest location, a product purchased in an e-commerce transaction, and a user terminal that instructs the management server or the AGV to transport the product, wherein the user terminal is provided with an instruction interface for issuing an instruction to pick up the product using the AGV as a pickup method in a case in which the product is purchased in an e-commerce transaction with the management server, and the AGV is controlled, based on control by the management server according to the instruction issued through the instruction interface, to execute pickup of the product.

Additionally, the management server includes a plurality of management servers, each of which can, but not necessarily, conduct e-commerce transactions individually, and in a case in which a product is purchased through the user terminal in each of one e-commerce transaction with one management server and another e-commerce transaction with another management server among the plurality of management servers, after the AGV executes pickup of the product purchased in the one e-commerce transaction based on control by the one management server according to an instruction issued through the instruction interface, control of the AGV by the one management server is transferred to the other management server.

Advantageous Effects of Invention

According to a transport system and the like according to an embodiment of the present invention, advantageous effects are exhibited whereby, for instance, a transport system and the like capable of meeting diverse user needs can be provided.

BRIEF DESCRIPTION OF DRAWINGS

FIG. 6 is a flowchart for explaining an example of a process flow in a transport system according to an embodiment of the present invention.

FIG. 7 is a flowchart for explaining an example of a process flow in a transport system according to an embodiment of the present invention.

FIG. 8 is an explanatory diagram for explaining an example of a detailed process flow in a transport system according to an embodiment of the present invention.

FIG. 9 is an explanatory diagram for explaining an example of a detailed process flow in a transport system according to an embodiment of the present invention.

DESCRIPTION OF EMBODIMENT

Hereinafter, a transport system and the like according to an embodiment of the present invention will be described in detail and with reference to the drawings.

Figure 1A:
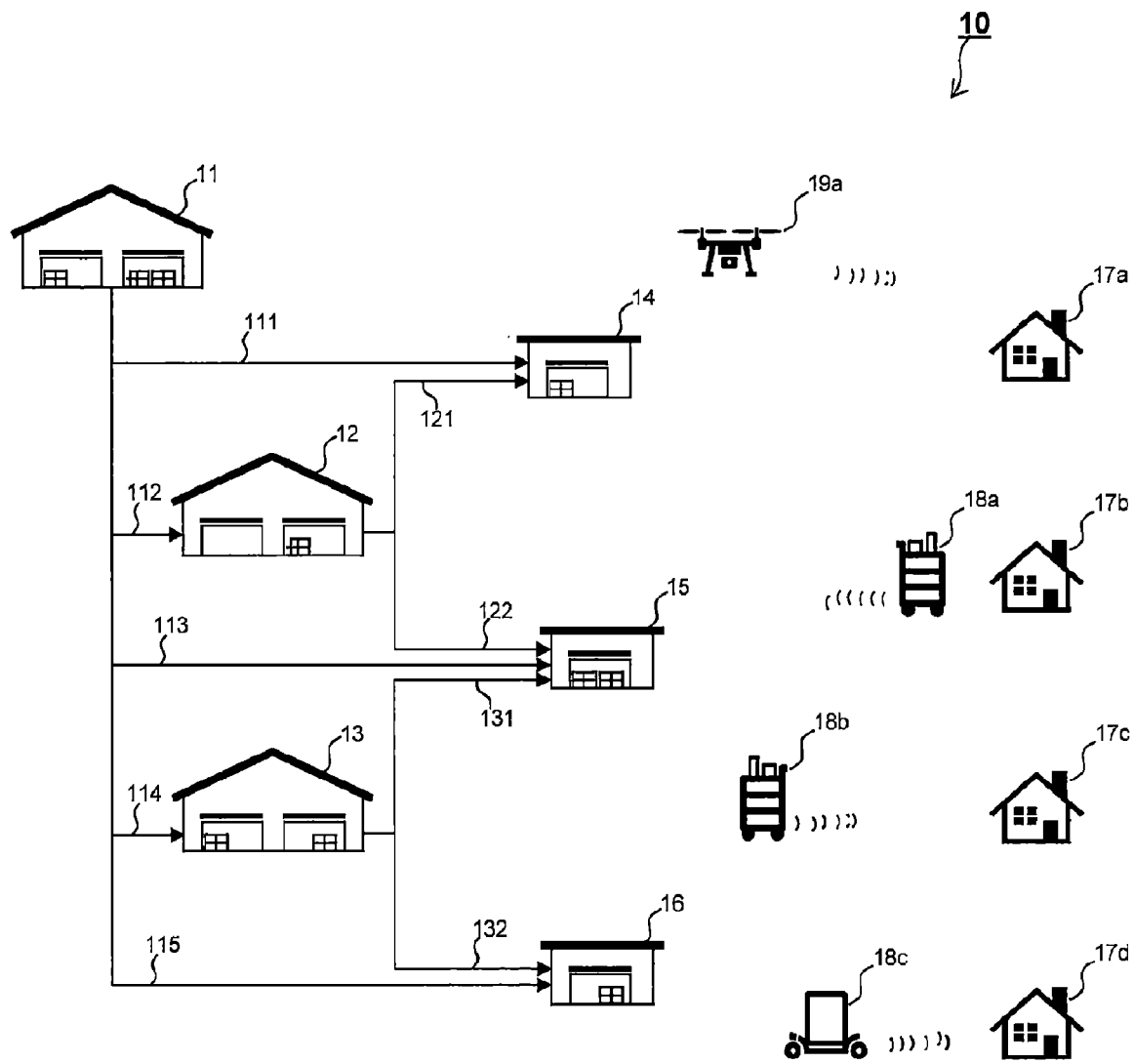
FIG. 1A is an explanatory diagram for explaining logistics in a transport system according to an embodiment of the present invention.

FIG. 1A schematically illustrates a logistics network including a transport system according to an embodiment of the present invention. In the drawing, a logistics network 10 illustrated in terms of facilities and distribution channels forms a logistics network for transporting packages, products, and the like (hereinafter also simply referred to as "products and the like") that broadly includes distribution centers 11 to 13 and nearest locations 14 to 16.

Furthermore, the transport system according to an embodiment of the present invention includes AGVs 18a to 18c or a UV 19a responsible for the transport of products and the like between the nearest locations 14 to 16 and user homes (hereinafter also referred to as "customer homes") 17a to 17d, and these AGVs or UV are communicably connected to management servers, user terminals (hereinafter also referred to as "customer terminals"), and the like described later.

Note that the numbers of the distribution centers 11 to 13 and the nearest locations 14 to 16 are not limited to the above numbers, and any number of centers and any number of locations may be included. For ease of understanding the present invention, the following description adheres to the model illustrated in FIG. 1A for convenience.

[Distribution Centers and Nearest Locations]

In one embodiment of the present invention, two types of facilities are included in the logistics network: distribution centers and nearest locations. In one embodiment, in addition to distribution centers serving as conventional distribution locations, nearest locations are provided as pickup locations for temporarily holding products, packages, and the like.

Also, as illustrated in FIG. 1A, each distribution center may fulfill a different role. For example, in the drawing, the distribution center 12 delivers products and the like to the nearest locations 14 and 15 through channels 121 and 122, respectively, and the distribution center 13 delivers products and the like to nearest locations 15 and 16 through channels 131 and 132, respectively, whereas the distribution center 11 delivers products and the like to the other distribution centers 12 and 13 through channels 112 and 114, respectively, while also fulfilling the role of delivering products and the like to the nearest locations 14, 15, and 16 through channels 111, 113, and 115, respectively. For example, products and the like are normally supplied to the nearest location 14 from the physically close distribution center 12, but if the distribution center 12 is out of stock, products and the like are also supplied to the nearest location 14 from the distribution center 11 in some cases.

The distribution centers 11 to 13 can also fulfill the roles of nearest locations. Consequently, in another embodiment of the present invention, a clear distinction between distribution centers and nearest locations may not exist in some cases.

Furthermore, some or all of the distribution centers 11 to 13 and the nearest locations 14 to 16 may be stores themselves, such as warehouse wholesale stores, mass merchandisers, supermarkets, and convenience stores.

[Logistics Management]

The present invention is not limited to the following, but the transport time (estimated time) of products and the like and the number of products and the like in stock at a location can be managed on a server in the transport system. An example of the overall configuration of a transport system according to an embodiment of the present invention will be described later with reference to FIG. 2, but as an example, a management server in the transport system according to an embodiment of the present invention may be installed at one of the distribution centers or nearest locations in FIG. 1A or in an office building not illustrated, such a management server may be connected to each center, each location, and information terminals through a network, and the management server can be made to manage the inventory status and numbers of products and the like going in and out of each location and the like as well as the transport status between locations or to destinations (customer homes). Furthermore, transport times between locations or to destinations (customer homes) can be calculated from past results and the like, and may be successively updated and managed.

Consequently, it is not necessarily the case that each of the channels in FIG. 1A is always the same route. For example, the channel from the distribution center 11 to the nearest location 14 is managed as 111 by the system, but one or more other routes may also be stored and managed as alternative routes.

These alternative routes may be adopted as alternatives depending on the traffic conditions at the time and indicated in instructions to specific delivery facilities (locations) or delivery means (AGVs or UVs).

[Sales Management]

Additionally, although not an essential requirement, the transport system according to an embodiment of the present invention may also be made to perform sales management of products and the like, as necessary. The transport system according to an embodiment of the present invention can also be made to cooperate with mail order (e-commerce) systems and store POS registers not illustrated and manage the mail order sales performance and the in-store sales performance for each customer. In one embodiment, databases (D1) to (D4) like the following are included in the management server as databases for the above purpose, and reference or update requests can be issued from various terminals, as necessary.

(D1) Customer Management Database

A database in which items related to customers are registered, in which personal information such as a customer name, an address, and a phone number is registered along with supplementary information such as points owned and the nearest location. Information (for example, information such as a vehicle identification number and model name) about AGVs or UVs owned solely or jointly by users or customers is also registered and managed.

(D2) Product Management Database

A database in which items related to products are registered, in which product names, product codes associated with JAN codes, and the like are registered and managed.

(D3) Stock Management Database

A database for managing product stock at each distribution location, from which necessary tables are derived and extracted in conjunction with the product management database, as appropriate. Also provided with a database for managing information related to products currently held for pickup by users or customers at the nearest location.

(D4) Sales Management Database

A performance management database related to products sold at each distribution center or store.

Figure 1B:
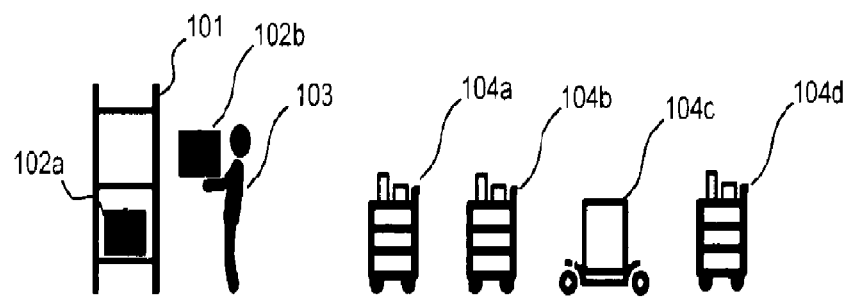
FIG. 1B is an explanatory diagram for explaining operations by AGVs in a transport system according to an embodiment of the present invention.

FIG. 1B illustrates operations by AGVs in the transport system according to an embodiment of the present invention. FIG. 1B illustrates a state in which AGVs 104a to 104d have arrived at a nearest location not illustrated and are lined up in order to be loaded with and bring back products and the like such as 102a and 102b stored on a rack 101 at the nearest location. FIG. 1B illustrates a staff member 103 at the nearest location retrieving a product or the like 102b to store the product or the like 102b in a storage part of the AGV 104a standing by at the front of the line.

In an embodiment of the present invention, the AGVs do not necessarily have to be controlled to arrive and stand by at the nearest location, and may also be controlled to regulate the speed when moving from a customer home to the nearest location, to stand by at any designated point, or the like so as to reduce congestion at the nearest location.

Figure 1C:
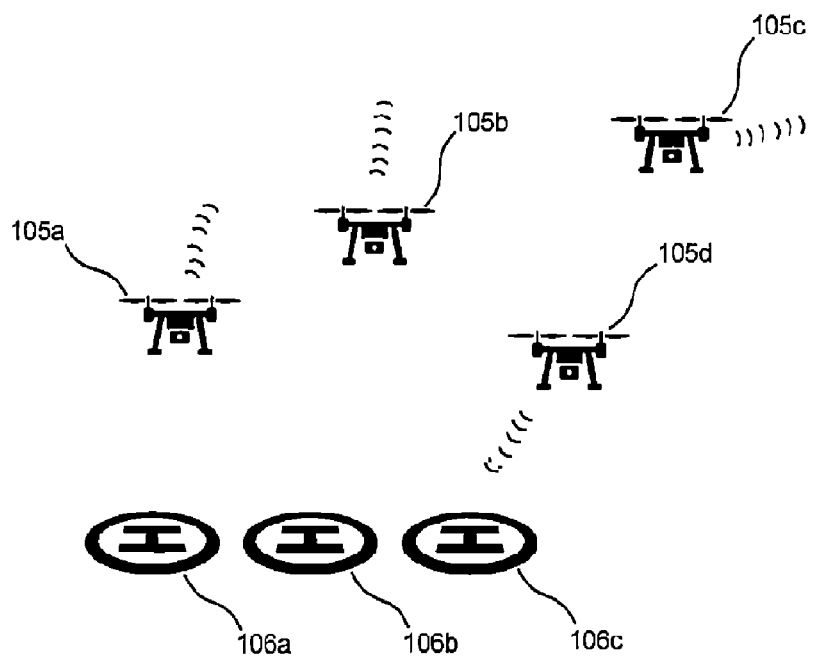
FIG. 1C is an explanatory diagram for explaining operations by UVs in a transport system according to an embodiment of the present invention.

FIG. 1C illustrates operations by UVs in the transport system according to an embodiment of the present invention. In FIG. 1C, drones are illustrated as an example of UVs, UVs 105a to 105c have arrived at a nearest location not illustrated, and a UV 105d is attempting to take off from the nearest location. As illustrated in the drawing, the UVs 105a to 105c are attempting to land on takeoff/landing platforms 106a to 106c installed at the nearest location. In this case, in an embodiment of the present invention, the UVs 105a to 105c can be configured to use a built-in camera to read a two-dimensional code (not illustrated) applied to the takeoff/landing platform or the like to confirm a designated platform and attempt a landing. Also, in another embodiment of the present invention, the UVs 105a to 105c can be configured to attempt a landing on a designated platform by using a built-in camera to recognize letters or numerals (not illustrated) drawn on a takeoff/landing platform.

Note that although FIG. 1C illustrates a drone as an example of a UV, the present invention is not limited thereto, and another unmanned aerial vehicle (UAV) such as an airplane or rocket, an unmanned ground vehicle (UGV) that does not use wheels, an unmanned surface vehicle (USV), an unmanned underwater vehicle (UUV), or the like may also be broadly adopted.

Figure 2:
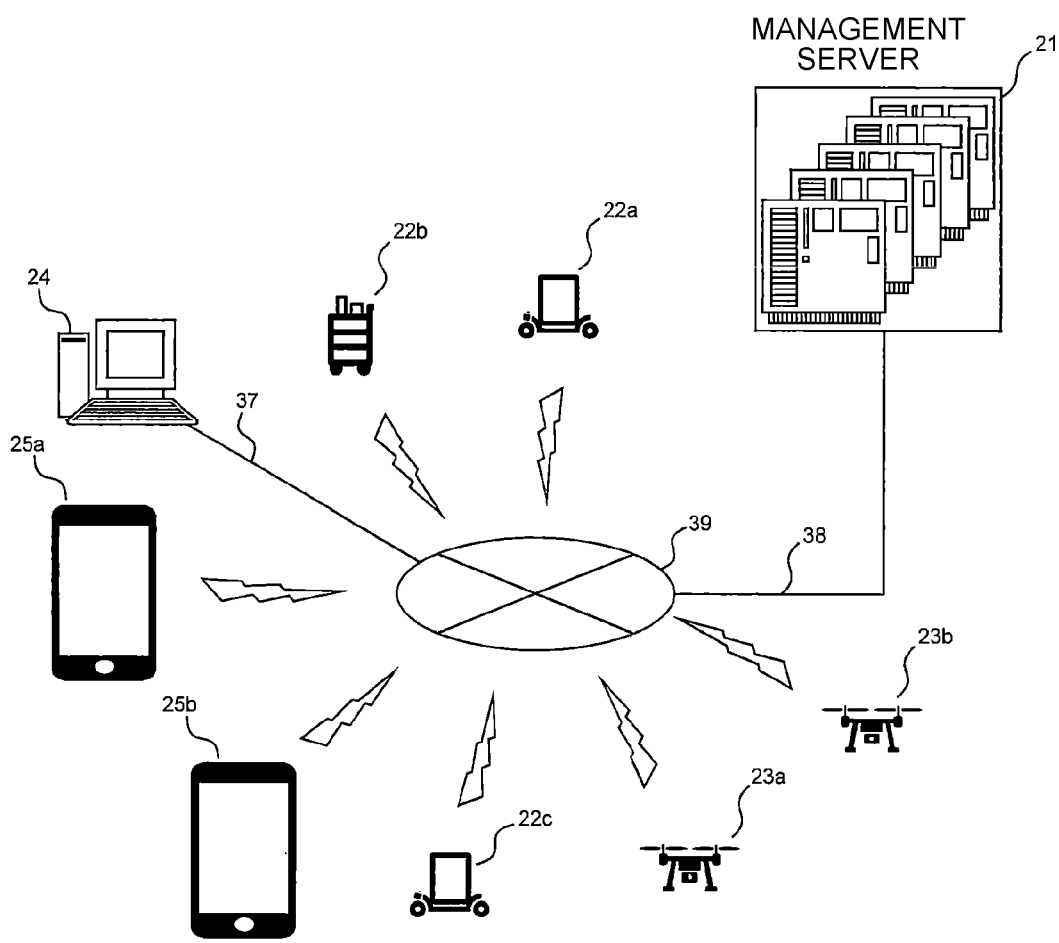
FIG. 2 is an explanatory diagram for explaining an example of the overall configuration of a transport system according to an embodiment of the present invention.

FIG. 2 illustrates an example of the overall configuration of a transport system according to an embodiment of the present invention. As illustrated in FIG. 2, as a general configuration of one embodiment, the transport system 20 includes a management server (group) 21, AGVs 22a to 22c and UVs 23a and 23b that go from customer homes to nearest locations to pick up products and the like, and various information processing devices used by location staff members, customers, and the like (exemplified in the drawing as a PC 24, mobile information terminals, and tablet terminals or POS terminals 25a and 25b; hereinafter collectively referred to as the "various terminals" or simply the "terminals").

Note that the number of the various terminals is not limited to what is illustrated in the drawing and may be any number. For example, the number of customer terminals may be assumed to correspond to the number of customers, whereas for the terminals installed at the locations, one or more terminals may be deployed at each location or a terminal may not be deployed at some locations.

In one embodiment of the present invention, the management server (group) 21 and the various terminals are communicably interconnected, as illustrated in FIG. 2, through dedicated lines or through public lines such as the Internet (37 to 39, as wired lines).

Moreover, the lines may be wired or wireless. In the case in which the lines are wireless, the various terminals 24, 25a, and 25b access the Internet 39 wirelessly through a base station, access point, or the like not illustrated, and from there are communicably interconnected to the management server (group) 21 through the line 38. Likewise, the AGVs 22a to 22c and the UVs 23a and 23b access the Internet 39, as necessary, through a base station or wireless station not illustrated, and are communicably interconnected to the management server (group) 21 and the various terminals 24, 25a, and 25b.

Here, an access point refers to a radio for interconnecting wireless terminals such as PCs and smartphones, and for connecting to other networks. Typically, an access point is a device that operates according to communication protocols in Layer 1 (physical layer) and Layer 2 (data link layer) of the OSI model.

Note that the AGVs 22a to 22c and the UVs 23a and 23b do not necessarily have to communicate with the management server (group) 21 and the like over the Internet 39, and may also be connected by other wireless communication means.

In addition, at the time of filing of this application, mobile information terminals and tablets are often furnished with processing power (such as communication processing speed and image processing performance) that equals or exceeds that of a personal computer (PC), and should be called compact high-performance computers.

Furthermore, a program or software necessary to carry out the present invention is ordinarily installed or stored on an HDD, SSD, or the like in a storage unit of a PC or a mobile information terminal, and when executing the program or software, some or all thereof is loaded as software modules into a memory in the storage unit, as necessary, and computationally executed on a CPU.

Alternatively, a browser-based computer or mobile information terminal can also be adopted. In this case, the configuration is such that a program is distributed from another server or computer, as necessary, and executed in a browser on a terminal.

Also, a PC basically can be adopted for the hardware configuration of the management server (group) 21 (described later with reference to FIG. 3A to be sure). Note that the present invention is not limited to the following, but the management server (group) 21 can also take a configuration suitable for large-scale data processing by running multiple PCs (as an example, from dozens to tens of thousands) in parallel to raise the hardware specifications, as necessary.

Figure 3A:
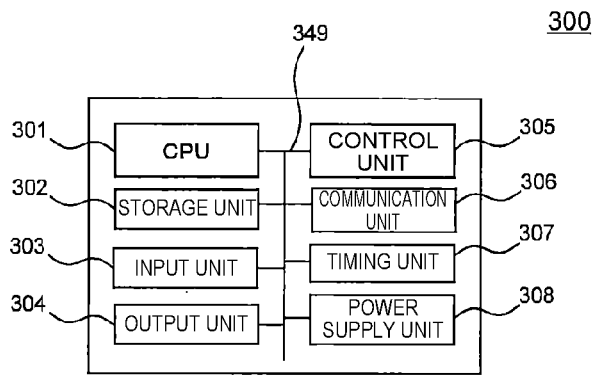
FIG. 3A is an explanatory diagram for explaining a function block configuration of a management server in a transport system according to an embodiment of the present invention.

FIG. 3A illustrates a function block diagram of a management server (corresponding to one server in the management server (group) 21) in the transport system according to an embodiment of the present invention. As an example, operations by the management server are achieved through individual operations by the hardware described below and through cooperation between software and the hardware.

In FIG. 3A, a management server 300 as an overall hardware block broadly includes: a CPU 301 for performing various comparative and arithmetic processing; a storage unit 302 such as RAM, ROM, and flash memory; an input unit 303 such as a keyboard and a pointing device; an output unit 304 such as a display and a speaker; a control unit 305 for various types of signal control; a communication (interface) unit 306 (which may be wired or wireless); a timing unit 307 for measuring time and the like; and a power supply unit 308.

These modules are connected, where necessary and as appropriate, by a communication bus and/or power supply lines (illustrated for convenience in FIG. 3A as wiring 349 that appropriately includes these lines such as a communication bus and power supply lines).

Additionally, a program or software to be executed on the management server 300 and necessary to carry out the present invention is ordinarily installed or stored on a hard disk drive, a solid-state drive (SSD), flash memory, or the like forming the storage unit 302, and some or all thereof is loaded as software modules into a memory in the storage unit 302, as necessary, and computationally executed on the CPU 301.

Note that the computational execution does not necessarily have to be performed on a central processing unit such as the CPU 301, and an auxiliary computational device such as a digital signal processor (DSP) not illustrated can also be used.

Figure 3B:
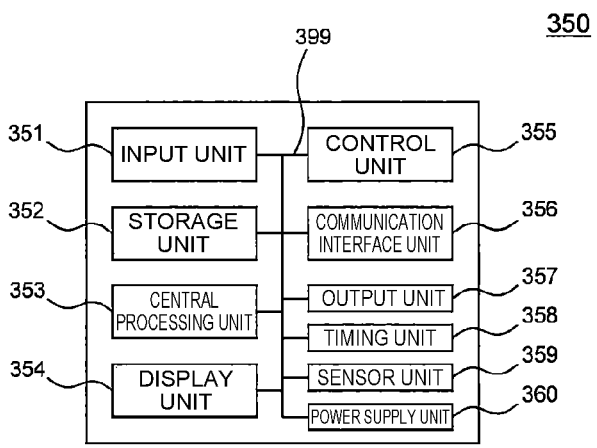
FIG. 3B is an explanatory diagram for explaining a function block configuration of a tablet terminal in a transport system according to an embodiment of the present invention.

FIG. 3B illustrates an example of a function block diagram of hardware forming a tablet terminal 25a as a customer terminal according to an embodiment of the present invention. As an example, operations by the tablet terminal 25a are achieved through individual operations by the hardware described below and through cooperation between software and the hardware.

In FIG. 3b, a tablet terminal 350 as an overall hardware block broadly includes: an input unit 351 formed from hardware buttons, a multi-touch input panel provided to a display, a microphone, and the like; a storage unit 352 formed from a hard disk, RAM and/or ROM, and the like for storing programs, data, and the like; a central processing unit 353 formed from a CPU that performs various numeric calculations and logic operations according to programs; a display unit 354 formed from a display or the like; a control unit 355 for controlling chips, an electrical system, and the like; a communication interface unit 356 formed from slots for accessing the Internet, ports for performing optical communication, and a communication interface; an output unit 357 such as a speaker, vibration, and an infrared projector; a timing unit 358 for measuring time and the like; a sensor unit 359 formed from a CMOS or other image sensor, an infrared sensor, an inertial sensor, and the like; and a power supply unit 360 for supplying power to each module inside the device, these modules being connected, where necessary and as appropriate, by a communication bus and/or power supply lines (illustrated for convenience in FIG. 3B as wiring 399 that appropriately includes these lines such as a communication bus and power supply lines).

Note that the sensor unit 359 may also include a GPS sensor module for specifying the location of the tablet terminal 350 (25a). Signals detected by the CMOS or other image sensor and the infrared sensor forming the sensor unit 359 can be processed as input information in the input unit 351.

Additionally, a program or software to be executed on the tablet terminal 350 and necessary to carry out the present invention is ordinarily installed or stored on a hard disk drive, a solid-state drive (SSD), flash memory, or the like forming the storage unit 352, and some or all thereof is loaded as software modules into a memory in the storage unit 352, as necessary, and computationally executed on the CPU 353.

Note that the computational execution does not necessarily have to be performed on the central processing unit 353 such as a CPU, and an auxiliary computational device such as a digital signal processor (DSP) not illustrated can also be used.

Figure 4A:
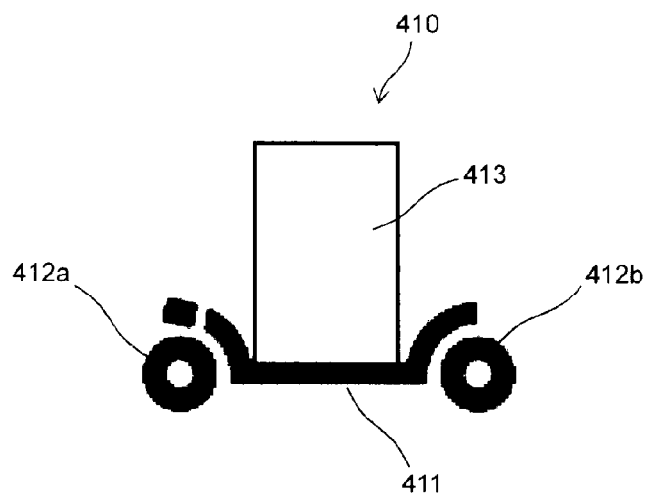
FIG. 4A is an explanatory diagram for explaining an example of the exterior configuration of an AGV in a transport system according to an embodiment of the present invention.
Figure 4B:
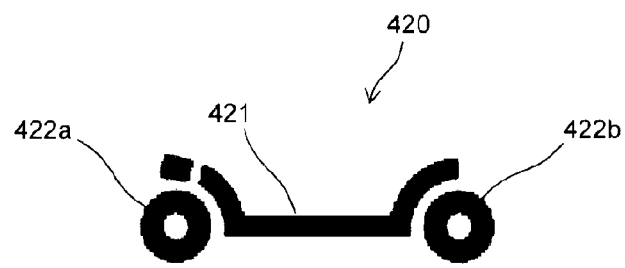
FIG. 4B is an explanatory diagram for explaining an example of the exterior configuration of an AGV in a transport system according to an embodiment of the present invention.
Figure 4C:
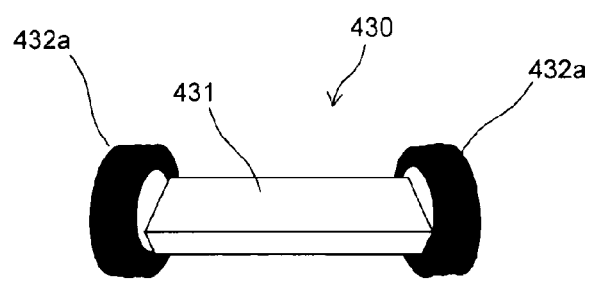
FIG. 4C is an explanatory diagram for explaining an example of the exterior configuration of an AGV in a transport system according to an embodiment of the present invention.
Figure 4D:
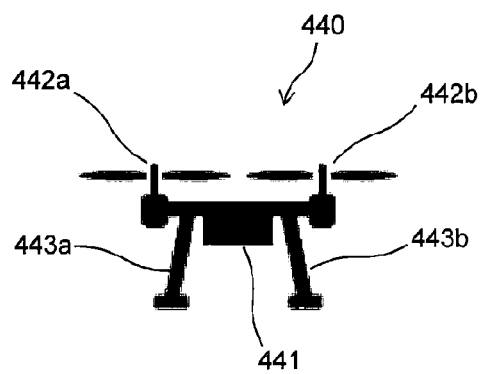
FIG. 4D is an explanatory diagram for explaining an example of the exterior configuration of a UV in a transport system according to an embodiment of the present invention.
Figure 4E:
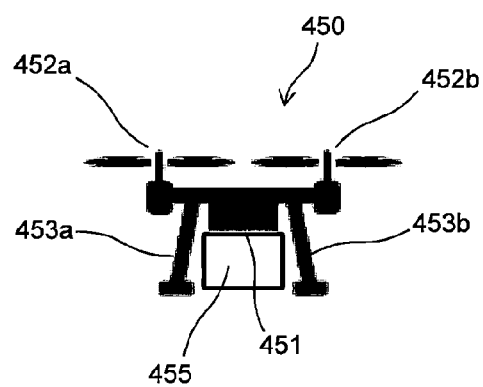
FIG. 4E is an explanatory diagram for explaining an example of the exterior configuration of a UV in a transport system according to an embodiment of the present invention.

FIGS. 4A to 4E illustrate exterior configurations of AGVs and UVs in the transport system according to an embodiment of the present invention. FIGS. 4A to 4C are examples of the exterior configuration of an AGV, while FIGS. 4D and 4E are examples of the exterior configuration of a UV (herein, a drone is given as an example). In one embodiment of the present invention, the AGV is assumed to be an automated guided vehicle and the UV is assumed to be an unmanned vehicle not required to have wheels, but it is not the intent of the present invention to make strict distinctions, and not only AGVs and UVs but also vehicles and transport machines that do not carry people are broadly included in embodiments of the present invention.

In FIG. 4A, an AGV 410 broadly includes a chassis unit 411, wheel units 412a and 412b, and a storage unit 413 storing products and the like, and otherwise includes a driving unit, an electrical system unit, and a control unit (including an electronic control unit) which are not illustrated. Furthermore, a communication unit for communicating with management servers, customer terminals, and the like and a GPS module unit for measuring the location of the AGV itself may also be installed onboard.

Also, in FIG. 4A, the AGV 410 is a four-wheeled vehicle, and the storage unit 413 mounted on the chassis unit 411 may be provided with a door or lid mechanism not illustrated and a corresponding lock mechanism not illustrated.

In FIG. 4B, an AGV 420 broadly includes a chassis unit 421 and wheel units 422a and 422b, and otherwise includes a driving unit, an electrical system unit, and a control unit (including an electronic control unit) which are not illustrated. Furthermore, a communication unit for communicating with management servers, customer terminals, and the like and a GPS module unit for measuring the location of the AGV itself may also be installed onboard. The AGV 420 likewise is a four-wheeled vehicle, and any given products and the like can be placed onto the chassis unit 421. Alternatively, a removable storage unit (not illustrated) may be employed on the chassis unit 421. In this case, if nothing is placed on the chassis unit 421, as illustrated in the drawing, the vehicle height is significantly lower than the AGV 420, thereby making it possible to duck under the lower part of the body of a general vehicle (car or truck), for example. Although some conflicts exists between general traffic regulations and AGV operation rules, there is the potential to create a unique distribution network that achieves high-speed travel without adversely affecting conventional traffic volumes.

In FIG. 4C, an AGV 430 broadly includes a chassis unit 431 and wheel units 432*a* and 432*b*, and otherwise includes a driving unit, an electrical system unit, and a control unit (including an electronic control unit) which are not illustrated. Furthermore, a communication unit for communicating with management servers, customer terminals, and the like and a GPS module unit for measuring the location of the AGV itself may also be installed onboard. As illustrated in the drawing, the AGV 430 likewise is a two-wheeled vehicle, and a gyro mechanism or the like not illustrated is provided such that a stable posture can be maintained both while stopped and while in motion. The AGV 430 has a low vehicle height similar to the AGV 420, thereby making it possible to duck under the lower part of the body of a general vehicle (car or truck), for example, and there is the potential to create a unique distribution network that achieves high-speed travel without adversely affecting conventional traffic volumes.

In FIG. 4D, a UV 440 includes a main body unit 441, propeller driving units 442*a* and 442*b*, and leg units 443*a* and 443*b*. In addition, another driving unit, an electrical system unit, and a control unit (including an electronic control unit) not illustrated are provided. Furthermore, a communication unit for communicating with management servers, customer terminals, and the like and a GPS module unit for measuring the location of the AGV itself may also be installed onboard. Although not entirely illustrated in FIG. 4D, in one embodiment of the present invention, the UV 440 is a quadcopter including four propeller driving units. Moreover, in one embodiment, the UV 440 includes four leg units. However, in another embodiment, the UV 440 may also be a drone provided with six propeller driving units, and may also be configured to have any number of leg units.

In FIG. 4E, a UV 450 includes a main body unit 451, propeller driving units 452*a* and 452*b*, and leg units 453*a* and 453*b*, and a storage unit 455 for a product or the like. In one embodiment of the present invention, the storage unit 455 may be provided with a door or lid mechanism not illustrated and a corresponding lock mechanism not illustrated.

In addition, the UV 450 is provided with another driving unit, an electrical system unit, and a control unit (including an electronic control unit) not illustrated. Furthermore, a communication unit for communicating with management servers, customer terminals, and the like and a GPS module unit for measuring the location of the AGV itself may also be installed onboard. Although not entirely illustrated in FIG. 4E, in one embodiment of the present invention, the UV 450 is a quadcopter including four propeller driving units, similar to the UV 440. Moreover, in one embodiment, the UV 450 includes four leg units. However, in another embodiment, the UV 450 may also be a drone provided with six propeller driving units, and may also be configured to have any number of leg units.

Figure 5:
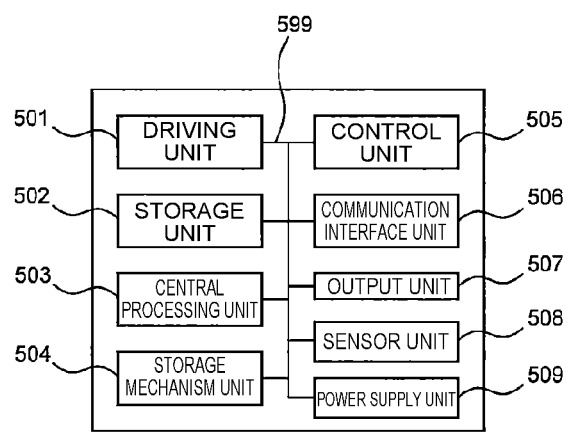
FIG. 5 is an explanatory diagram for explaining a function block configuration of hardware forming an AGV or a UV according to an embodiment of the present invention.

FIG. 5 illustrates a function block configuration of hardware forming an AGV according to an embodiment of the present invention. In FIG. 5, an AGV 500 as an overall hardware block broadly includes: a driving unit 501 such as a motor for driving the wheels; a storage unit 502 formed from a hard disk, RAM and/or ROM, and the like for storing programs, data, and the like; a central processing unit 503 formed from a CPU that performs various numeric calculations and logic operations according to programs; a storage mechanism unit 504 which is a mechanism unit for opening/closing and locking a storage unit for storing a product and the like; a control unit 505 for controlling chips, an electrical system, and the like; a communication interface unit 506 formed from slots for accessing a network, ports for issuing short-range wireless notifications, and a communication interface; an output unit 507 such as a speaker; a sensor unit 508 formed from a CMOS or other image sensor, an infrared sensor, an inertial sensor, and the like; and a power supply unit 509 for supplying power to each module inside the device, these modules being connected, where necessary and as appropriate, by a communication bus and/or power supply lines (illustrated for convenience in FIG. 5 as wiring 599 that appropriately includes these lines such as a communication bus and power supply lines).

Note that in one embodiment of the present invention, the sensor unit 508 may also include a GPS sensor module for specifying the location of the AGVs 22*a* to 22*c*. Also, signals detected by the CMOS or other image sensor and the infrared sensor forming the sensor unit 508 can be processed as input information in an input unit not illustrated.

Additionally, a program or software to be executed on the AGV 500 and necessary to carry out the present invention is ordinarily installed or stored on a hard disk drive, a solid-state drive (SSD), flash memory, or the like forming the storage unit 502, and some or all thereof is loaded as software modules into a memory in the storage unit 502, as necessary, and computationally executed on the CPU 503.

Note that FIG. 5 illustrates an example of a function block configuration of hardware forming an AGV according to an embodiment of the present invention, but even the case of a UV is provided with a configuration similar to an AGV with regard to the transport mechanism for transporting products and the like, except that the driving unit 501 is a propeller driving unit and the storage mechanism unit 504 differs at the level of known technology, for example.

FIG. 6 illustrates an example of a process flow in a transport system according to an embodiment of the present invention. The process flow illustrated in FIG. 6 assumes, by way of example, that the user (customer) can choose how to pick up a product and the like when the user (customer) purchases the product and the like through e-commerce using their own terminal. Conventionally, the user has had the choice of delivery to the user home, or going to the nearest location or store for pickup by themself. In one embodiment of the present invention, the user is given the choice for causing an unmanned vehicle such as an AGV or a UV to go to the nearest location or store to pick up a product or the like (hereinafter described in terms of an AGV as a representative of an unmanned vehicle for convenience).

Additionally, in one embodiment of the present invention, if the user has chosen to cause the AGV to go to the nearest location or store to pick up a product or the like, first, communication is established between the user terminal and the AGV, a check is performed to confirm whether the AGV is operable, and if there are no problems, operation of the AGV is initiated. Hereinafter, the flow will be described on the basis of FIG. 6.

In step S601, when the process is started, the flow proceeds to step S602 and the user orders a product or the like through the user terminal. The present invention is not limited to the following, but the order may also include a purchase process and a payment process. In one embodiment, the user accesses, through the user terminal, an EC site or the like operated by the seller's server, and a procedure for ordering a desired product or the like is performed.

Next, the flow proceeds to step S603, and the user selects a method of picking up the product or the like ordered through the user terminal. At this point, selection or instruction input is given to indicate that the AGV is to be used to go pick up the product or the like being held at the nearest location or store. In one embodiment of the present invention, the selection or instruction input is transmitted to a management server, and is registered or managed in the management server. Furthermore, in one embodiment, a reply is issued from the management server to the user terminal to indicate acknowledgment of the pickup by the AGV.

In step S604, an instruction is issued from the user terminal to the AGV. The instruction includes at least a command to the subject AGV to pick up a prescribed product or the like. In another embodiment of the present invention, the instruction to the AGV may be issued from the management server, based on user consent or user registration details.

In step S605, information about the product or the like to be picked up and information about the nearest location or store to go to for pickup is transmitted from the user terminal to the AGV. In another embodiment of the present invention, this information may also be transmitted to the AGV from the management server rather than from the user terminal, or the AGV may be made to acquire the information from the management server.

In step S606, as one example, a check of the battery level and the like in the AGV is performed. This check confirms whether the battery level is sufficient for the AGV to make a round trip to the designated nearest location or store and back. Alternatively, the check may include a confirmation of whether the battery level is sufficient to perform pickup of all products currently purchased in one or more e-commerce transactions. Otherwise, various inspections and status confirmations for travel, not illustrated, may also be performed.

In step S607, on the basis of the items checked in the previous step, it is determined whether the AGV is operable to proceed the designated nearest location or store. In the case of Yes in step S607, the flow proceeds to step S608, whereas in the case of No, the flow proceeds to step S609.

In step S609, an alert notification is issued to the user terminal to indicate that the AGV cannot be operated to proceed to the designated nearest location or store. In one embodiment, the notifications are like those in the following table.

TABLE 1

| Message (status) code | Message example (status example) |
|---|---|
| 1 | Now charging. Insufficient battery level for round trip to location and back. |
| 2 | Now traveling through ABC to pick up another product. |
| 3 | Malfunction detected. Malfunction no. 123 |

In step S609, in one embodiment, the AGV stands by for an instruction from the user after having issued an alert notification like the above to the user terminal.

In step S610, the processing operation is different depending on instruction content from the user terminal as to whether operation may be started. In this step, in the case of Yes, the flow proceeds to step S608, whereas in the case of No, the flow proceeds to step S612 and the current flow ends.

At this point, in the case of Yes in step S610, a conditional operation instruction like in the following table is issued (the status codes in the following table correspond to each of the message codes in the above table), according to the message content (that is, the status of the AGV) in the above table.

TABLE 2

| Status code | Condition for operation instruction |
|---|---|
| 1 | Start operation when current charging is completed. |
| 2 | Start operation for pickup of next product when pickup of current product is completed. |
| 3 | Start operation regardless of malfunction. |

In this case, for each status, the AGV may be controlled to make a more detailed query to the user before receiving an instruction from the user. For example, in the case of message (status) 1, a query such as "X minutes until charging is completed. Start operation for product pickup once charging is completed?" is made from the AGV to the user terminal. If the user gives a Yes instruction by pressing a button not illustrated, as soon as charging is complete, the AGV proceeds to the nearest location or store to pick up the designated product or the like.

At this point, in yet another embodiment, it is also possible to make a further detailed query as follows from the AGV to the user. "Currently charging at 50%. A level of 80% is required for a round trip to the designated nearest location (store) and back. Start operation as soon as level of 80% is reached? Or start operation after 100% charging is completed?"

In this case, the user can, through a selection button or the like not illustrated, instruct the AGV to start operation as soon as the 80% battery level is reached, being the minimum level required for pickup of the current product or the like, or to start operation after 100% charging is completed, and the AGV starts operation (proceeds to step S608) according to the user instruction.

Also, in a status in the above table, such as the case of status 2, for example, control may also be performed to make a query regarding the selection of the following (A) or (B) from the AGV to the user terminal. (A) The AGV first returns to the user home to drop off another product or the like before proceeding to pick up the current product or the like. (B) The AGV does not return to the user home, but instead proceeds directly to pick up the current product or the like.

The user can respond to the query through a selection button or the like not illustrated, and the AGV continues operation according to the user instruction. The present invention is not limited to the following, but in one embodiment, in the former case (A), the flow may proceed to step S611 without proceeding to step S608 and operation can be continued until the return to the user home, whereas in the latter case (B), the flow proceeds to step S608 and operation of the AGV can be continued by transferring control rights for the AGV to a management server, as necessary.

In step S608, as described above, at this time the AGV is not necessarily in a status of standing by at the user home, but the control rights for the AGV are transferred to the management server. That is, the AGV is to be operated through an exchange with the management server rather than the user terminal. In other words, the AGV operates based on control by the management server.

Here, as described above, if the AGV is already operating to pick up another product at this time, at an appropriate timing after having returned to the user home or completed the pickup of the other product at the nearest location or store, control rights for the AGV are transferred from the current management server to another management server (the detailed flow will be described later with reference to FIG. 9).

In step S611, operation of the AGV is started. The details will be described later with reference to FIG. 7. When the operation of the AGV ends (typically upon return to the user home), the flow proceeds to step S612 and the current flow ends.

Here, the operation of the AGV from the user home to the nearest location in one embodiment of the present invention includes control that includes (1) guidance to the nearest location, (2) regulation of the moving speed, and (3) standby regulation at the nearest location or the like.

FIG. 7 illustrates a process flow in a transport system according to an embodiment of the present invention. The process flow illustrated in FIG. 7 is a flowchart for explaining in detail the process flow in step S611 of FIG. 6, and more specifically, is a flowchart illustrating a detailed operating process flow during the operation of the AGV.

In step S701, when AGV starts operation, the flow proceeds to step S702 and the AGV performs regular operation. In one embodiment of the present invention, at this time, directions and the like to the nearest location or store to proceed to have already been set in the AGV, or operation is carried out after having confirmed the nearest location or store to proceed to.

Also, the regular operation in step S702 includes safety checks when starting the AGV (including, for instance, safety checks using a camera, not illustrated, that is mounted on the AGV), stopping at intersections and the like, and changing course such as turning right, turning left, or changing lanes.

Next, step S703 and step S705 are positioned as interrupts that are determined at any time during the regular operation of the AGV (thus, in the case of No in step S705, the flow returns to step S702). Additionally, in step S703, it is determined whether there is an instruction for speed regulation or the like from the management server; if Yes, the flow proceeds to step S704, and if No, the flow proceeds to step S705. In one embodiment of the present invention, the instruction for speed regulation or the like determined in step S703 is regulated, as appropriate, according to the status (busy conditions) at the nearest location or store, the crowding of standby AGVs, and the like.

In step S704, control for speed regulation or the like is received according to an instruction from the management server. The control for speed regulation or the like at this point includes acceleration and/or deceleration of the AGV, as well as standby partway along the operation route. In one embodiment, the AGV can regulate the arrival time at the destination by appropriately raising or lowering the operation speed. Also, a standby instruction is transmitted from the management server to the AGV with consideration given to not adversely affect traffic and not disturb the surrounding area, and is implemented by the AGV that has received the standby instruction.

In step S705, a determination is made, as one type of interrupt process, as to whether the AGV has arrived at the nearest location or store which is the destination; if Yes, the flow proceeds to step S706, and if No, the flow returns to step S702.

In step S706, at the nearest location or store of arrival, the ordered product or the like is stored. At this point, a door is unlocked while on standby not illustrated (see the illustration in FIG. 1B, for example) or when storing the product or the like. In one embodiment of the present invention, the storing or loading of the product or the like onto the AGV may be performed automatically using a robot or the like, or partial manual loading may be performed. Also, in one embodiment, when the storing or loading of the product or the like is completed, the AGV can notify the management server and/or the user terminal.

In step S707, a determination is made in the management server or the AGV as to whether there is a pickup of another product or the like at the next nearest location or store; if Yes, the flow proceeds to step S708, and if No, the flow proceeds to step S710. In step S710, the AGV is set to a user home return mode or the like, and return operation to the user home is started. Thereafter, when the AGV returns to the user home, the current flow ends (step S711).

In step S708, the control rights for the AGV are transferred from one management server to another management server. In one embodiment of the present invention, the transfer of control rights includes a control rights transfer from the management server operated by a retailer A, which is responsible for the nearest location (or store) where the product or the like that has currently finished being loaded was placed to a management server operated by a retailer B, which is responsible for the nearest location (or store) where the product or the like to be picked up next is placed. In this case, during the operation to the nearest location to pick up the first product or the like, the AGV operates based on control by the management server operated by the retailer A, and next, after the loading of the product or the like purchased from the retailer A is finished, the AGV transfers its own control rights to the management server operated by the retailer B and continues to operate based on control by the management server operated by the retailer B.

Alternatively, in another embodiment of the present invention, the AGV may be configured to continue to operate under the management of an integrated server that integrates the functions of the management server operated by the retailer A and the management server operated by the retailer B described above. Differences in the operating modes of the individual management servers and the integrated server will be described later with reference to FIG. 9.

Next, the flow proceeds to step S709, the AGV continues to operate proceeding toward the next nearest location, and the flow returns to step S702.

FIG. 8 illustrates an example of operations in a transport system according to an embodiment of the present invention.

In FIG. 8, the "user terminal" corresponds to the terminals 25a and 25b in FIG. 2 as one example, and the "information processing server" corresponds to the management server (group) 21 in FIG. 2. Also, in FIGS. 8, t1 to t10 indicate the flow of a time series in which operations and processes described later are performed over time.

Note that the operation or process times (such as t1) exemplified in the embodiment are exemplary illustrations for facilitating understanding of the general concepts of the present invention, and the present invention is not limited to the individual time-series relationships exemplified in the embodiment.

First, at the time t1, the user (customer) downloads, from the information processing server through the user terminal, application software for causing their own user terminal to operate as an information processing terminal according to the present invention (step S801). The application software is client software or application software for processing some or all of the programs according to the present invention. Additionally, the downloaded application software is installed on the user terminal (step S802). At this time, at time t2, the user's own email address as well as profile information like in the following table may also be uploaded, as necessary, from the user terminal to the information processing server as a user registration (step S803) for registration and management (step S804).

TABLE 3

| Name (username) | Member no. (ID) | Email address (mobile number) | Gender | Date of birth | Region of residence (area etc.) |
| --- | --- | --- | --- | --- | --- |

The above data items are saved as user data in a storage device on the information processing server (step S805). From time t3, the user (customer) can use the app by operating the information processing terminal. Furthermore, the server provides services to the terminal.

Next, the user who has downloaded and installed the app on the user terminal launches the application software at time t4 (step S806). In one embodiment, the user receives services provided to the information processing terminal by the information processing server from time t4 to time t5.

When time t5 is reached, the user suspends or terminates the application software according to an embodiment of the present invention. At this time, status information pertaining to the application is transferred, as necessary, to the information processing server (step S807), and on the server, the status information is received, updated (step S808), and saved (step S809) as user information about the user. In FIG. 8, these processes are completed by time t6.

Note that after the application software according to an embodiment of the present invention is installed on the information processing terminal, the application software can also be executed on the terminal in an at least partially closed state, and in this case, the above steps S804 to S805 and steps S808 to S809 may be omitted. Moreover, necessary information is saved and managed in the memory on the terminal, as appropriate.

Next, in FIG. 8, the processing operations from time t7 to time t10 illustrate an exemplary embodiment of a case in which at least a portion of the application software according to an embodiment of the present invention is carried out on the information processing server. In this case, the user (customer) performs the two typical user terminal operations of login operation and command transmission, and necessary data is received from the information processing server, or services are provided.

For example, at time t7 in FIG. 8, if the user performs a server login process through their own information processing terminal (step S810), a required authentication process is performed, as appropriate, on the information processing server (step S811), and at time t8, data enabling the user to receive provided services is transmitted (step S812). For example, the data is a top menu screen configured to receive commands from the terminal, an application launcher screen, or the like.

At time t9, the user transmits a command of some kind through the information processing terminal (step S813). The command may be selected from a menu displayed on the menu screen, and in some cases may also be a start command for starting an application on an application launcher screen. On the server side, the command is received, and a service process is started (step S814). Thereafter, at time t10, a service is provided by the server in accordance with a request from the terminal (step S815).

Note that, although not illustrated in FIG. 8, commands can be transmitted at any time from time t10 from the terminal (such as a message transmission command and a menu selection command, for example), and on the server, the command from the terminal may be received at such times and services may be provided (such as forwarding a received message to another terminal, or analyzing a message and returning a result, for example).

FIG. 9 illustrates a detailed example of operations in a transport system according to an embodiment of the present invention. In FIG. 9, the "user terminal" corresponds to the terminals 25a and 25b in FIG. 2 as one example, the "AGV" corresponds to 22a to 22c in FIG. 2 as one example, the "nearest location 1" and "nearest location 2" correspond to servers responsible for 14 to 16 in FIG. 1A as an example (these servers do not necessarily have to be set up at the locations), and the server may correspond to the management server 21 in FIG. 2, as described later. Furthermore, the "information processing server" corresponds to the management server (group) 21 in FIG. 2. Also, in FIGS. 9, t21 to t37 indicate the flow of a time series in which operations and processes described later are performed over time.

In particular, FIG. 9 illustrates an example for explaining a situation in which the user purchases a product A from a store A and a product B from a store B over the Internet or the like, and an AGV of the user is used to go and pick up the products A and B at the nearest location for each.

Additionally, in FIG. 9, the processing operations from t21 to t26 illustrate an example in which, in the case where the user purchases the product A from the store A and the product B from the store B over the Internet or the like as described above, the "information processing server" functions as an integrated server that controls the AGV, and furthermore, the processing operations from t31 to t37 illustrate an example in which, in the case where the user purchases the product A from the store A and the product B from the store B over the Internet or the like, the servers (which do not necessarily have to be set up at the locations)

responsible for the "nearest location 1" and the "nearest location 2" each function as the management server 21 in FIG. 2.

[Case in which "Information Processing Server" Functions as Integrated Server that Controls AGV]

At t21 of FIG. 9, the user orders the product A online from the store A through the user terminal (electronic payment may also be made at this time; step S901), and likewise orders the product B online from the store B through the user terminal (electronic payment may also be made at this time; step S902).

Next, at t22, the user requests, through the user terminal, the AGV to go to the nearest location 1 to pick up the product A (step S903). Meanwhile, at the store A, arrangements are made to deliver the product A that the user has purchased to the nearest location 1 based on management by a store A server not illustrated, and at the store B, arrangements are made to deliver the product B that the user has purchased to the nearest location 2 based on management by a store B server not illustrated (in FIG. 9, these situations are omitted).

The AGV, receiving the request from the user described above, makes a request regarding control of its own operation to the server of the store A (step S904), and the server of the store A requests the information processing server for control of the AGV (step S905). As a result, AGV control for pickup, at the nearest location 1, of the product A that the user has purchased is entrusted to the information processing server.

Note that in FIG. 9, the AGV control by the information processing server is described using the example of transferring control rights through the store A server (step S904, step S905), but the present invention is not limited thereto, and after issuing the request from the user terminal to the AGV (step S903), the AGV may also be controlled to entrust its own control rights directly to the information processing server. In this case, necessary information is shared between the information processing server and the store A server.

After time t22, the information processing server enacts the control of the AGV (step S906), and the AGV starts operation accordingly (step S907). Thereafter, the information processing server and the AGV can communicate at any time to continue operation (indicated by the dashed lines in the diagram). Also, in one embodiment of the present invention, communication may take place between the store A server at the nearest location 1 and the information processing server (step S908). For example, information related to the degree of crowding of standby AGVs at the nearest location 1 is shared. The information processing server receives such information and regulates the speed of the AGV or issues a standby instruction.

At time t23, the AGV arrives at the nearest location 1, and in step S909, the storing (loading) of the product A on the AGV is performed.

Next, at time t24, when the storing of the product A on the AGV is completed, a storage completion notification is sent from the store A server to the information processing server (step S910) and a storage completion notification is also sent from the AGV to the user terminal (step S911). At this point, in FIG. 9, the storage completion notification is illustrated with a distinction between the notification from the store A server to the information processing server (step S910) and the notification from the AGV to the user terminal (step S911), but the present invention is not limited thereto, and the notification route can be changed within a scope allowed by the design. Alternatively, some or all of these notifications may be omitted insofar as the carrying out of the present invention is unaffected.

After time t24, the information processing server, still maintaining control rights for the AGV, next controls operation to cause the AGV to go to the nearest location 2 to pick up the product B (step S912). The AGV starts operation accordingly (step S913). Thereafter, the information processing server and the AGV can communicate at any time to continue operation (indicated by the dashed lines in the diagram). Also, in one embodiment of the present invention, communication may take place between the store B server at the nearest location 2 and the information processing server (step S914). For example, information related to the degree of crowding of standby AGVs at the nearest location 2 is shared. The information processing server receives such information and regulates the speed of the AGV or issues a standby instruction.

At time t25, the AGV arrives at the nearest location 2, and in step S915, the storing (loading) of the product B on the AGV is performed.

Next, at time t26, when the storing of the product B on the AGV is completed, a storage completion notification is sent from the store B server to the information processing server (step S916) and a storage completion notification is also sent from the AGV to the user terminal (step S917). At this point, in FIG. 9, the storage completion notification is illustrated with a distinction between the notification from the store B server to the information processing server (step S916) and the notification from the AGV to the user terminal (step S917), but the present invention is not limited thereto, and the notification route can be changed within a scope allowed by the design. Alternatively, some or all of these notifications may be omitted insofar as the carrying out of the present invention is unaffected.

Then, after time t26, the AGV is not scheduled to go to pick up another product, and therefore operates to return to the user home (step S918). In FIG. 9, at time t27, the AGV returns to the user home.

[Case in which Servers Responsible for "Nearest Location 1" and "Nearest Location 2" Each Function as Management Server 21]

At t31 of FIG. 9, the user orders a product C online from the store A through the user terminal (electronic payment may also be made at this time; step S951), and likewise orders a product D online from the store B through the user terminal (electronic payment may also be made at this time; step S952).

Next, at t32, the user requests, through the user terminal, the AGV to go to the nearest location 1 to pick up the product C (step S953). Meanwhile, at the store A, arrangements are made to deliver the product C that the user has purchased to the nearest location 1 based on management by a store A server not illustrated, and at the store B, arrangements are made to deliver the product D that the user has purchased to the nearest location 2 based on management by a store B server not illustrated (in FIG. 9, these situations are omitted).

The AGV, receiving the request from the user described above, makes a request regarding control of its own operation to the server of the store A (step S954). As a result, AGV control for pickup, at the nearest location 1, of the product C that the user has purchased is entrusted to the store A server.

After time t32, the store A server enacts the control of the AGV (step S955), and the AGV starts operation accordingly (step S956). Thereafter, the store A server and the AGV can communicate at any time to continue operation (indicated by the dashed lines in the diagram). For example, in consideration of the degree of crowding of standby AGVs at the nearest location 1 and the like, the store A server regulates the speed of the AGV or issues a standby instruction.

At time t33, the AGV arrives at the nearest location 1, and in step S957, the storing (loading) of the product C on the AGV is performed.

Next, at time t34, when the storing of the product C on the AGV is completed, in one embodiment of the present invention, an AGV control request is issued from the store A server to the store B server (step S958). At this point, if the store B server accepts the AGV control request from the store A server, the control rights for the AGV are transferred from the store A server to the store B server.

In addition, a storage completion notification is sent from the AGV to the user terminal (step S959). Regarding the completion notification, the notification route can be changed within a scope allowed by the design, such as by sending the notification from the store A server to the user terminal. Alternatively, some or all of these notifications may be omitted insofar as the carrying out of the present invention is unaffected.

After time t34, the store B server controls the AGV (step S960) and causes operation for going to the nearest location 2 to pick up the product D (step S961). Thereafter, the store B server and the AGV can communicate at any time to continue operation (indicated by the dashed lines in the diagram). For example, in consideration of the degree of crowding of standby AGVs at the nearest location 2 and the like, the store B server regulates the speed of the AGV or issues a standby instruction.

At time t35, the AGV arrives at the nearest location 2, and in step S962, the storing (loading) of the product D on the AGV is performed.

Next, at time t36, when the storing of the product D on the AGV is completed, a storage completion notification is sent from the AGV to the user terminal (step S963). Regarding the completion notification, the notification route can be changed within a scope allowed by the design, such as by sending the notification from the store A server to the user terminal. Alternatively, some or all of these notifications may be omitted insofar as the carrying out of the present invention is unaffected.

Then, after time t36, the AGV is not scheduled to go to pick up another product, and therefore operates to return to the user home (step S964). In FIG. 9, at time t37, the AGV returns to the user home.

[Other Variations] (Handling of Completed Transaction)

In one embodiment of the present invention, regarding the handling of a "completed transaction" of an e-commerce transaction according to the ordering or purchasing of individual products and the like, a transaction can be considered a completed transaction at the point in time of any of various processes or the like. As an example, a transaction can be processed as being completed at the point in time of the following (1) to (3).

(1) The point in time of payment for the individual e-commerce transactions among the one or more e-commerce transactions (such as step S901 and step S902 in FIG. 9, for example).

(2) The point in time of loading the product purchased in the one or more e-commerce transactions onto the AGV at the nearest location (such as the point in time of the completion of step S909 or step S915 in FIG. 9, for example).

(3) The point in time at which the AGV brings the product purchased in the one or more e-commerce transactions to the home of the user who uses the user terminal, and a confirmation of the product is indicated by the user through the user terminal (such as the point in time when a confirmation process is performed by the user through the user terminal, not illustrated, at the completion of step S918 or step S964 in FIG. 9, for example).

(AGV Sharing)

In one embodiment of the present invention, the AGVs may be interpreted as being owned by individual users, but the present invention is not limited thereto, and an AGV may also be shared by multiple users. Examples include sharing by the residents of an apartment or condominium complex, or time-sharing with respect to an unspecified large number of people using a parking area or the like. In this case, sharing management and reservation management are performed using known technology, and one or more AGVs are shared by multiple users.

The foregoing describes an embodiment of a transport system and the like on the basis of concrete examples, but an embodiment of the present invention may also be a method or program for carrying out a system or device, and moreover, an embodiment is also attainable in the form of a storage medium (examples of which include an optical disc, magneto-optical disc, CD-ROM, CD-R, CD-RW, magnetic tape, hard disk, and memory card) on which a program is recorded.

Also, an embodiment as a program is not limited to an application program such as object code compiled by a compiler or program code executed by an interpreter, and may also be in the form of a program module or the like incorporated into an operating system.

Furthermore, the program does not necessarily require that all processing be performed only by a CPU on a control board, and can also be configured such that the processing is performed, in part or in whole, by another processing unit (such as a DSP) mounted on an expansion board or expansion unit added to the board, as necessary.

All of the structural elements described in this specification (including the claims, abstract, and drawings) and/or all of the steps of all of the disclosed methods or processes can be combined in any way, except for combinations in which these features are mutually exclusive.

Moreover, each of the features described in this specification (including the claims, abstract, and drawings) may be replaced by alternative features that serve the same purposes, equivalent purposes, or similar purposes, unless expressly denied. Therefore, unless explicitly denied, each of the disclosed features is only one example of a comprehensive set of the same or equal features.

Furthermore, the present invention is not limited to any of the specific configurations of the embodiment described above. The present invention may be extended to all new features or combinations thereof described in this specification (including claims, abstract, and drawings), or to all new methods or processing steps or combinations thereof described herein.

REFERENCE SIGNS LIST

10 logistics network
20 transport system
21 management server (group)
22a to 22c AGV
23a, 23b UV
24 PC (one aspect of a location terminal or customer terminal)

25a, 25b tablet terminal (one aspect of a location terminal or customer terminal)
37, 38 communication line
39 public line (dedicated line, Internet, etc.)

The invention claimed is:

1. A transport system comprising:
a management server;
an automated guided vehicle (AGV) that travels from a home of a user to a pickup location to pick up a product purchased by the user in an e-commerce transaction, the AGV having an accommodation part for accommodating the product at the pickup location and a battery to drive the AVG to travel, wherein the AVG comprises a battery and a control unit controlling and checking a battery level of the battery; and
a user terminal that instructs the AGV directly or via the management server to transport the product, wherein
the user terminal is provided with an instruction interface for communicates with the AGV directly or via the management server to determine whether the AGV is operable and, if the AGV is determined to be operable, issuing an instruction to pick up the product using the AGV as a pickup method when the product is purchased in the e-commerce transaction with the management server, and
the AGV is controlled, based on control by the management server according to the instruction issued through the instruction interface, to travel from the home of the user to the pickup location and execute pickup of the product at the pickup location;
wherein when the one or more e-commerce transactions are conducted and the AGV initiates preparing for pickup of the product purchased in the one or more e-commerce transactions according to an instruction issued through the instruction interface of the user terminal, the control unit of the AGV checks and calculates the battery level of the battery and a distance of a round trip between the pickup location and the home of the user, and evaluates a minimum battery level of the battery to execute pickup of the product purchased in the one or more e-commerce transactions and complete the round trip, and the control unit of the AVG starts operation of the AVG when the battery of the AVG is charged to reach the minimum battery level of the battery, wherein
the management server comprises a plurality of management servers that individually conduct e-commerce transactions, and is configured such that at least two servers among the plurality of management servers individually conduct e-commerce transactions, and
a product is purchased through the user terminal in each of one e-commerce transaction with a first management server and another e-commerce transaction with a second management server among the plurality of management servers, and
after the AGV executes pickup of the product purchased in the one e-commerce transaction based on control by the first management server according to an instruction issued through the instruction interface, control of a driving of the AGV by the first management server is transferred to the second management server, then the second management server controls the driving of the AGV from the pickup location to a next pickup location.

2. The transport system according to claim 1, wherein the control includes at least one of (1) guidance to a pickup location, (2) regulation of a moving speed, and (3) standby regulation at a pickup location.

3. The transport system according to claim 1, wherein the one or more individual e-commerce transactions with the AGV being used to transport the product are processed as being completed transactions at any of
(1) a point in time of payment for the individual e-commerce transactions among the one or more e-commerce transactions,
(2) a point in time of loading the product purchased in the one or more e-commerce transactions onto the AGV at the pickup location, and
(3) a point in time at which the AGV brings the product purchased in the one or more e-commerce transactions to the home of the user who uses the user terminal, and a confirmation of the product is indicated by the user through the user terminal.

4. The transport system according to claim 1, wherein the AGV is shared by a plurality of users through a plurality of user terminals.

5. A non-transitory computer-readable storage medium containing a program to be executed on a transport system comprising a management server, an automated guided vehicle (AGV) that travels from a home of a user to a pickup location to pick up a product purchased by the user in an e-commerce transaction, the AGV having an accommodation part for accommodating the product at the pickup location and a battery to drive the AVG to travel, wherein the AVG comprises a battery and a control unit controlling and checking a battery level of the battery, and a user terminal that instructs the AGV directly or via the management server to transport the product,
the program executing:
a step of providing an instruction interface on the user terminal for communicating with the AGV directly or via the management server to determine whether the AGV is operable and, if the AGV is determined to be operable, issuing an instruction to pick up the product using the AGV as a pickup method when the product is purchased in the e-commerce transaction with the management server; and
a step of controlling the AGV by the management server, according to the instruction issued through the instruction interface, to travel from the home of the user to the pickup location and execute pickup of the product at the pickup location;
wherein when the one or more e-commerce transactions are conducted and the AGV initiates preparing for pickup of the product purchased in the one or more e-commerce transactions according to an instruction issued through the instruction interface of the user terminal, the control unit of the AGV checks and calculates the battery level of the battery and a distance of a round trip between the pickup location and home of the user, and evaluates a minimum battery level of the battery to execute pickup of the product purchased in the one or more e-commerce transactions and complete the round trip, and the control unit of the AVG starts operation of the AVG when the battery of the AVG is charged to reach the minimum battery level of the battery, wherein
the management server comprises a plurality of management servers that can also individually conduct e-commerce transactions, and is configured such that at least two servers among the plurality of management servers can individually conduct e-commerce transactions,
a product is purchased through the user terminal in each of one e-commerce transaction with a first management server and another e-commerce transaction with a second management server among the plurality of management servers, and after the AGV executes pickup of the product purchased in the one e-commerce transaction based on control by the first management server according to an instruction issued through the instruction interface, control of a driving of the AGV by the first management server is controlled to be transferred to the second management server, then the second management server controls the driving of the AGV from the pickup location to a next pickup location.

6. The program according to claim 5, wherein the control includes at least one of (1) guidance to a pickup location, (2) regulation of a moving speed, and (3) standby regulation at a pickup location.

7. The transport system according to claim 1, wherein there are other locations to pick up one or more products, and the pickup location is determined as one location that is geographically the most closest to the home of the user among these locations.

* * * * *